(12) United States Patent
Beck et al.

(10) Patent No.: US 12,163,577 B2
(45) Date of Patent: Dec. 10, 2024

(54) TRANSMISSION AND DRIVE DEVICE FOR A MOTOR VEHICLE

(71) Applicant: ZF Friedrichshafen AG, Friedrichshafen (DE)

(72) Inventors: Stefan Beck, Eriskirch (DE); Matthias Reisch, Ravensburg (DE); Eckhardt Lübke, Friedrichshafen (DE); Domenico Bartilucci, Friedrichshafen-Fischbach (DE); Tamas Gyarmati, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/481,495

(22) Filed: Oct. 5, 2023

(65) Prior Publication Data

US 2024/0117868 A1 Apr. 11, 2024

(30) Foreign Application Priority Data

Oct. 6, 2022 (DE) ...................... 10 2022 210 581.8

(51) Int. Cl.
*F16H 48/22* (2006.01)
*F16H 37/08* (2006.01)
*F16H 48/10* (2012.01)
*F16H 48/11* (2012.01)
*F16H 48/24* (2006.01)

(52) U.S. Cl.
CPC .......... *F16H 37/082* (2013.01); *F16H 48/10* (2013.01); *F16H 48/11* (2013.01); *F16H 48/22* (2013.01); *F16H 48/24* (2013.01); *F16H 2200/0021* (2013.01); *F16H 2200/0034* (2013.01); *F16H 2200/201* (2013.01); *F16H 2200/2035* (2013.01)

(58) Field of Classification Search
CPC .................. F16H 37/082; F16H 48/10; F16H 2200/0021; F16H 2200/201; F16H 48/11; F16H 48/36; F16H 2048/368; B60K 2001/001; B60K 2007/0092; B60K 17/046; B60K 17/34; B60K 17/165; B60Y 2400/804; B60Y 2200/91
USPC ........................................ 475/150, 323, 338
See application file for complete search history.

(56) References Cited

U.S. PATENT DOCUMENTS 5,437,583 A * 8/1995 Shibahata ............... F16H 48/36
475/84
2008/0064552 A1 * 3/2008 Tangl ................. B60K 17/3462
475/248

FOREIGN PATENT DOCUMENTS

DE 102013215877 A1 2/2015
DE 102017104019 B3 * 3/2018 ............... B60K 1/00

* cited by examiner

*Primary Examiner* — Roger L Pang
(74) *Attorney, Agent, or Firm* — Dority & Manning, P.A.

(57) ABSTRACT

A transmission for a motor vehicle includes a first, a second, and a third planetary gear set, an input shaft, a first and a second output shaft, and a first and a second coupling shaft. Respective elements of the first planetary gear set are rotationally fixed to the input shaft, rotationally fixed to the first coupling shaft, and rotationally fixed to the second coupling shaft. Respective elements of the second planetary gear set are rotationally fixed to the first coupling shaft, rotationally fixed to a stationary component, and rotationally fixed to the second output shaft. Respective elements of the third planetary gear set are rotationally fixed to the second coupling shaft, rotationally fixed to the first output shaft, and rotationally fixed to the second output shaft.

30 Claims, 8 Drawing Sheets

TRANSMISSION AND DRIVE DEVICE FOR A MOTOR VEHICLE

CROSS-REFERENCE TO RELATED APPLICATION

The present application is related and has right of priority to German Patent Application No. DE102022210581.8 filed on Oct. 6, 2022, which is incorporated by reference in its entirety for all purposes.

FIELD OF THE INVENTION

The invention relates generally to a transmission for a motor vehicle. The invention further relates generally to a drive device having a transmission and to a motor vehicle having a drive device.

BACKGROUND

For example, DE 10 2013 215 877 A1 discloses an epicyclic gearing for branching the drive power applied at a power input to a first power output and to a second power output in conjunction with a reduction of the output speed to a rotational speed level that is below the input speed at the power input. The epicyclic gearing has a first transmission stage, which includes a first sun gear, a first planetary gear set, a first planet carrier and a first ring gear, a second transmission stage, which includes a second sun gear, a second planetary gear set, a second planet carrier and a second ring gear, and a third planetary gear stage, which includes a third sun gear, a third planetary gear set and a third planet carrier. The first sun gear is designed as a power input, the first planet carrier is non-rotatably coupled to the second sun gear, the second planet carrier is stationarily fixed, the first ring gear is coupled to the third sun gear, the first power output takes place via the third transmission stage, and the second power output takes place via the second ring gear of the second transmission stage.

SUMMARY OF THE INVENTION

Example aspects of the present invention provide an alternative transmission, which has, in particular, improved power density and improved efficiency. The transmission is to generate, from an input torque, two approximately same sized output torques, which are greater than the input torque. Consequently, the transmission is to implement a transmission function, i.e., a torque conversion, and a differential function.

A transmission according to example aspects of the invention for a motor vehicle has a first planetary gear set, a second planetary gear set and a third planetary gear set, wherein each planetary gear set includes a first element, a second element and a third element, five shafts, namely an input shaft for connecting the transmission to a prime mover of the motor vehicle, a first output shaft and a second output shaft for connecting the transmission to a wheel of the motor vehicle in each case, a first coupling shaft and a second coupling shaft for connecting two elements of two planetary gear sets for conjoint rotation in each case, wherein one of the elements of the first planetary gear set is rotationally fixed to the input shaft, wherein another of the elements of the first planetary gear set is rotationally fixed to the first coupling shaft, wherein another of the elements of the first planetary gear set is rotationally fixed to the second coupling shaft, wherein one of the elements of the second planetary gear set is rotationally fixed to the first coupling shaft, wherein another of the elements of the second planetary gear set is rotationally fixed to a stationary component, wherein another of the elements of the second planetary gear set is rotationally fixed to the second output shaft, wherein one of the elements of the third planetary gear set is rotationally fixed to the second coupling shaft, wherein another of the elements of the third planetary gear set is rotationally fixed to the first output shaft, wherein another of the elements of the third planetary gear set is rotationally fixed to the second output shaft.

A "connection" of a device or of an element to the transmission is considered to mean that the transmission, in particular the relevant shaft of the transmission, is connected to the device or to the element either directly, for example, in a non-rotatable manner, or indirectly, for example, via at least one further component, in particular via at least one further shaft or one further gear. When two shafts are connected to each other for conjoint rotation, the two shafts rotate together in one direction of rotation at one rotational speed. In particular, the connection can also be established via a shift element, as a result of which the device or the element can be drivingly coupled and decoupled to/from the relevant shaft of the transmission.

A "shaft" is not considered exclusively to be a, for example, cylindrical, rotatably mounted transmission element for transmitting torques, but rather is considered to also be general connecting elements that connect individual components or elements to one another, in particular, connecting elements that connect multiple elements to one another for conjoint rotation. Two shafts that are connected to each other for conjoint rotation can be formed as one piece.

A "stationary component" is considered to be a non-rotating component of the transmission. For example, the stationary component can be a housing or a housing section of the transmission. Alternatively, the stationary component can be a housing-fixed shaft.

Consequently, the first planetary gear set is at least indirectly or directly connected or connectable to the prime mover via the input shaft, and is connected to the second planetary gear set via the first coupling shaft and is connected to the third planetary gear set via the second coupling shaft. Moreover, the second planetary gear set is rotationally fixed to the housing and connected to the third planetary gear set via the second output shaft. In addition, the third planetary gear set is connected to the first output shaft. Via the first output shaft, the third planetary gear set is at least indirectly or directly connected or connectable to a first wheel of the motor vehicle. Moreover, via the second output shaft, the second planetary gear set and the third planetary gear set are at least indirectly or directly connected or connectable to a second wheel of the motor vehicle.

For example, the prime mover is an electric machine, which is operable as a drive motor for driving the vehicle and as a generator for recuperating electrical energy. For this purpose, the electric machine is electrically connected to an electrical energy store. The electric machine includes a rotor and a stator, wherein the rotor is rotationally fixed to a rotor shaft. The rotor shaft of the electric machine is at least indirectly or directly connected to the input shaft. For example, the rotor shaft of the electric machine is connected to the input shaft via at least one further shaft, via multiple gears and/or via a traction mechanism, for example, a belt or chain. The electric machine can be arranged on a common rotation axis with the transmission and, therefore, designed to be coaxial to the input shaft, wherein the rotor shaft is then preferably rotationally fixed to the input shaft. Alternatively, the electric machine can be axially parallel to the input shaft, wherein the rotor shaft is then indirectly connected to the input shaft. Alternatively, the prime mover can be an internal combustion engine that includes a crankshaft.

According to one preferred example embodiment, the first element of the first planetary gear set is rotationally fixed to the input shaft, wherein the second element of the first planetary gear set is rotationally fixed to the first coupling shaft, wherein the third element of the first planetary gear set is rotationally fixed to the second coupling shaft, wherein the first element of the second planetary gear set is rotationally fixed to the first coupling shaft, wherein the second element of the second planetary gear set is rotationally fixed to a stationary component, wherein the third element of the second planetary gear set is rotationally fixed to the second output shaft, wherein the first element of the third planetary gear set is rotationally fixed to the second coupling shaft, wherein the second element of the third planetary gear set is rotationally fixed to the first output shaft, wherein the third element of the third planetary gear set is rotationally fixed to the second output shaft.

According to one preferred example embodiment, the first element of the first planetary gear set is rotationally fixed to the input shaft, wherein the second element of the first planetary gear set is rotationally fixed to the second coupling shaft, wherein the third element of the first planetary gear set is rotationally fixed to the first coupling shaft, wherein the first element of the second planetary gear set is rotationally fixed to the first coupling shaft, wherein the second element of the second planetary gear set is rotationally fixed to a stationary component, wherein the third element of the second planetary gear set is rotationally fixed to the second output shaft, wherein the first element of the third planetary gear set is rotationally fixed to the second output shaft, wherein the second element of the third planetary gear set is rotationally fixed to the first output shaft, wherein the third element of the third planetary gear set is rotationally fixed to the second coupling shaft.

According to one preferred example embodiment, the first element of the first planetary gear set is rotationally fixed to the input shaft, wherein the second element of the first planetary gear set is rotationally fixed to the first coupling shaft, wherein the third element of the first planetary gear set is rotationally fixed to the second coupling shaft, wherein the first element of the second planetary gear set is rotationally fixed to the first coupling shaft, wherein the second element of the second planetary gear set is rotationally fixed to a stationary component, wherein the third element of the second planetary gear set is rotationally fixed to the second output shaft, wherein the first element of the third planetary gear set is rotationally fixed to the second output shaft, wherein the second element of the third planetary gear set is rotationally fixed to the first output shaft, wherein the third element of the third planetary gear set is rotationally fixed to the second coupling shaft.

According to one preferred example embodiment, the first element of the first planetary gear set is rotationally fixed to the input shaft, wherein the second element of the first planetary gear set is rotationally fixed to the first coupling shaft, wherein the third element of the first planetary gear set is rotationally fixed to the second coupling shaft, wherein the first element of the second planetary gear set is rotationally fixed to the first coupling shaft, wherein the second element of the second planetary gear set is rotationally fixed to the second output shaft, wherein the third element of the second planetary gear set is rotationally fixed to a stationary component, wherein the first element of the third planetary gear set is rotationally fixed to the second coupling shaft, wherein the second element of the third planetary gear set is rotationally fixed to the second output shaft, wherein the third element of the third planetary gear set is rotationally fixed to the first output shaft.

According to one preferred example embodiment, the first element of the first planetary gear set is rotationally fixed to the input shaft, wherein the second element of the first planetary gear set is rotationally fixed to the second coupling shaft, wherein the third element of the first planetary gear set is rotationally fixed to the first coupling shaft, wherein the first element of the second planetary gear set is rotationally fixed to the first coupling shaft, wherein the second element of the second planetary gear set is rotationally fixed to the second output shaft, wherein the third element of the second planetary gear set is rotationally fixed to a stationary component, wherein the first element of the third planetary gear set is rotationally fixed to the second coupling shaft, wherein the second element of the third planetary gear set is rotationally fixed to the second output shaft, wherein the third element of the third planetary gear set is rotationally fixed to the first output shaft.

According to one preferred example embodiment, two of the three planetary gear sets are radially nested. In other words, the elements of the two planetary gear sets are arranged to be axially overlapping such that one of the two planetary gear sets is arranged on the outside and the other of the two planetary gear sets is arranged on the inside. As a result, the transmission is more compact, in particular in the axial direction. Preferably, the first and the third planetary gear sets are radially nested. Alternatively, the second and the third planetary gear sets are radially nested.

According to one preferred example embodiment, one of the two coupling shafts or one of the two output shafts is formed as one piece with the elements of the respective planetary gear set connected thereto. For example, a coupling shaft or an output shaft can be formed in one piece as an intermediate gear having two tooth systems, wherein an internal toothing of the intermediate gear forms a ring gear for a radially inner planetary gear set, and wherein an external toothing of the intermediate gear forms a sun gear for a radially outer planetary gear set. An intermediate gear of this type is also referred to as a sun-ring gear. Alternatively, a coupling shaft or an output shaft can have a tooth system, which forms a common ring gear for two planetary gear sets. Alternatively, a coupling shaft or an output shaft can have a tooth system, which forms a common sun gear for two planetary gear sets. Alternatively, a coupling shaft or an output shaft can form a common planet carrier.

According to one preferred example embodiment, at least one of the planetary gear sets is a minus or negative planetary gear set, wherein the first element of the respective planetary gear set is a sun gear, wherein the second element of the respective planetary gear set is a planet carrier, wherein the third element of the respective planetary gear set is a ring gear. Multiple planet carriers, which are meshed with the sun gear and the ring gear, are rotatably mounted on the planet carrier.

Alternatively, at least one of the planetary gear sets can be a minus or negative stepped planetary gear set, wherein the planet carrier then guides multiple stepped planetary gears in a rotatably mounted manner. Each stepped planetary gear has two gears, which are connected to each other in a rotationally fixed manner. In other words, each stepped planetary gear has two toothing sections, which are connected to each other in a rotationally fixed manner and have different diameters. One of the two toothing sections meshes with the sun gear and the other of the two toothing sections meshes with the ring gear. When the first element of the minus stepped planetary gear set is a sun gear, the third element of the minus stepped planetary gear set is a ring gear. When the first element of the minus stepped planetary gear set is a ring gear, the third element of the minus stepped planetary gear set is a sun gear. The second element of the minus stepped planetary gear set is a planet carrier in both cases.

According to one preferred example embodiment, at least one of the planetary gear sets is a plus or positive planetary gear set, wherein the first element of the respective planetary gear set is a sun gear, wherein the second element of the respective planetary gear set is a ring gear, wherein the third element of the respective planetary gear set is a planet carrier. In a plus planetary gear set, the planet carrier guides at least one planet gear pair, in which one planet gear is meshed with the internal sun gear and the other planet gear is meshed with the surrounding ring gear, and the planet gears are intermeshed with each other.

Alternatively, at least one of the planetary gear sets can be a plus or positive stepped planetary gear set having two sun gears, or a plus stepped planetary gear set having two ring gears. In a plus stepped planetary gear set having two sun gears, the first and the second elements of the plus stepped planetary gear set are each a sun gear, wherein the third element of the plus stepped planetary gear set is a planet carrier. In a plus stepped planetary gear set having two ring gears, the first and the second elements of the plus stepped planetary gear set are each a ring gear, wherein the third element of the plus stepped planetary gear set is a planet carrier.

According to one preferred example embodiment, a constant gear stage is arranged in the power flow upstream from the input shaft. Consequently, the gear stage is a pre-ratio. For example, the gear stage is a planetary gear set having a sun gear, a ring gear and planet carriers, or a spur gear stage having at least two intermeshing gears. When the gear stage is a planetary gear set, one of the elements of the planetary gear set is fixed to the housing, another of the elements is at least indirectly or directly connected or connectable to a shaft of the prime mover and another of the elements is rotationally fixed to the input shaft. When the gear stage is a spur gear stage, the prime mover is arranged axially parallel to the transmission and, therefore, also to the input shaft and the two output shafts. Higher ratios can be obtained in the transmission by means of one gear stage.

According to one preferred example embodiment, a first shift element for shifting a first gear and a second shift element for shifting a second gear are arranged in the power flow upstream from the input shaft. A "shift element" is considered to be an engageable device, which has at least a disengaged state and an engaged state. In the disengaged state, two shafts connected thereto can freely rotate. In the engaged state, the two shafts are connected to each other in a rotationally fixed manner. For example, the first and the second shift elements, together with a planetary gear set, form a 2-speed assembly, which is connected upstream from the three planetary gear sets of the transmission. The upstream planetary gear set includes, for example, the elements sun gear, ring gear and planet carrier. The upstream planetary gear set is interlocked via the first shift element. In other words, two elements of the upstream planetary gear set, for example, the sun gear and the ring gear, are connected for conjoint rotation such that the upstream planetary gear set rotates as a unit and has the ratio one (1). Via the second shift element, one of the elements of the upstream planetary gear set, for example, the sun gear, is non-rotatably connected to the housing such that another ratio is set. Consequently, the second shift element is a brake. A "brake" is considered in this context to be an engageable device, which, in an engaged state, rotationally fixes a shaft of the upstream planetary gear set to a housing such that this shaft is then stationarily fixed and, therefore, is prevented from rotating. In a disengaged state of the shift element, the shaft is decoupled from the housing, as a result of which this shaft can freely rotate. Every shift element is actuatable by a particular actuator.

According to one preferred example embodiment, a shift element for generating an interlock is arranged between the two output shafts. This shift element can be a friction-locking shift element or a form-locking shift element. For example, a form-locking shift element is a dog clutch. The efficiency of the transmission can be increased by a form-locking shift element due to reduced drag losses. In particular, form-locking shift elements are more compact and have been optimized with respect to efficiency, and they have a cost advantage over friction-locking shift elements. A continuous slip operation, i.e., a limited interlock having a differential speed, is not possible with form-locking shift elements, however. For example, a friction-locking shift element has multiple disks or at least one conical friction surface. In the case of a friction-locking shift element, the friction-locking shift element can be actuated via an actuator or mechanically, in particular by using axial forces from helical gearings. An actuator can be fixed to the housing or arranged for conjoint rotation.

A drive device according to example aspects of the invention has a prime mover and a transmission according to example aspects of the invention. Preferably, the prime mover is an electric machine. Alternatively, the prime mover is an internal combustion engine. The prime mover can be arranged coaxially or axially parallel to the input shaft of the transmission. Via the input shaft, the drive power of the prime mover is fed into the transmission and distributed onto the two output shafts, wherein the respective output shaft is drivingly connected to a respective driving wheel of a drive axle of the vehicle.

A vehicle according to example aspects of the invention includes a drive device according to example aspects of the invention. In particular, the vehicle is an electric vehicle and has an electric drive axle that includes the drive device according to example aspects of the invention. The aforementioned definitions and comments regarding technical effects, advantages and advantageous example embodiments of the transmission according to example aspects of the invention also apply similarly for the drive device according to example aspects of the invention and for the vehicle according to example aspects of the invention.

BRIEF DESCRIPTION OF THE DRAWINGS

Advantageous embodiments of the invention, which are explained in the following, are shown in the drawings, wherein identical elements are provided with identical reference characters. Wherein.

DETAILED DESCRIPTION

Figure 1:
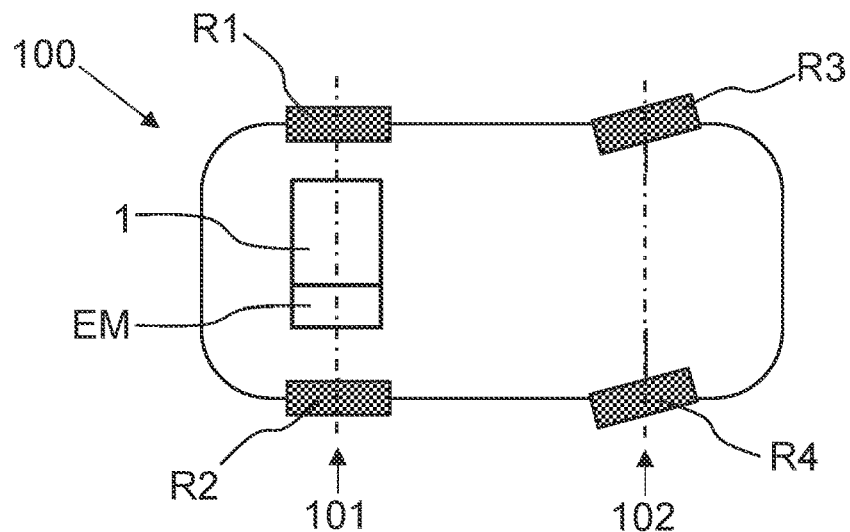
FIG. 1 shows a highly abstract schematic view of a motor vehicle that includes a drive device according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 100 that has a first wheel axle 101 including two wheels R1, R2 and a second wheel axle 102 including two wheels R3, R4. In the present case, the first wheel axle 101 is a rear drive axle of the motor vehicle 100 and is equipped with a drive device according to example aspects of the invention, the drive device having a single prime mover 2, which is an electric machine, and a transmission 1, which is an epicyclic gearing. Consequently, the motor vehicle 100 is an electric vehicle. The drive device is arranged transversely to the vehicle longitudinal direction and is drivingly connected to the wheels R1, R2 of the first wheel axle 101. In the present case, a further drive device is not arranged on the second wheel axle 102, i.e., on the front axle of the vehicle 100, as a result of which costs, weight and installation space are saved. Alternatively, the drive device can also be arranged on the front axle of the motor vehicle 100, instead of on the rear axle. In order to implement an all-wheel drive system, a further drive device can be arranged on the second wheel axle 102 and operatively connected to the wheels R3, R4 on this wheel axle 102.

Figure 2:
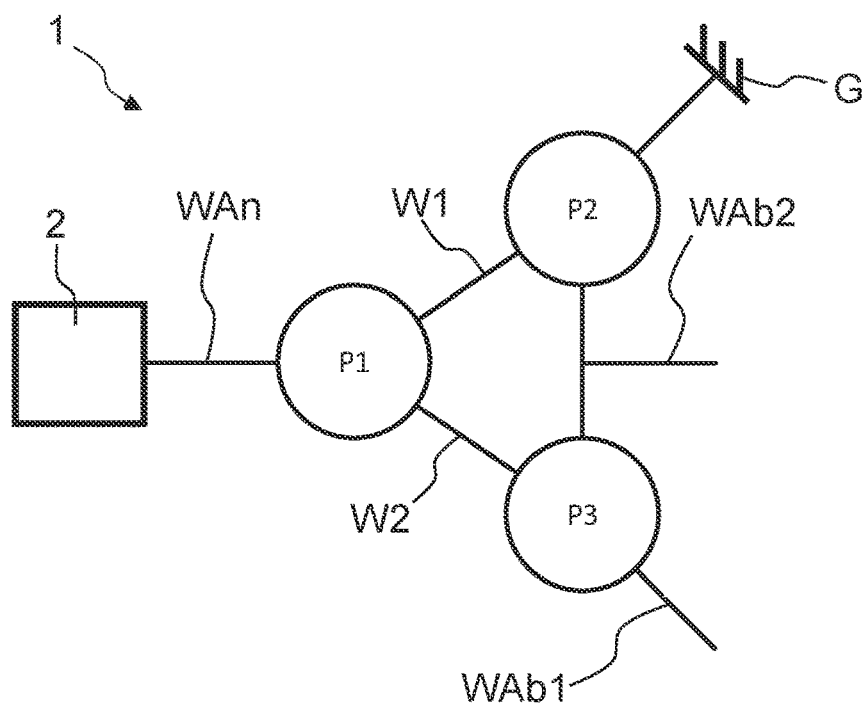
FIG. 2 shows a highly abstract basic diagram of the drive device according to example aspects of the invention.

FIG. 2 schematically shows a basic diagram of the drive device according to FIG. 1. The transmission 1 of the drive device has a first planetary gear set P1, a second planetary gear set P2, and a third planetary gear set P3, each of which is graphically represented by a circle. Each planetary gear set P1, P2, P3 includes a first element, a second element and a third element, each of which is indicated by three possible connections at the particular planetary gear set P1, P2, P3. Moreover, the transmission 1 includes five shafts, namely an input shaft WAn for connecting the transmission 1 to the prime mover 2, a first output shaft WAb1 and a second output shaft WAb2, each for connecting the transmission 1 to a wheel of the motor vehicle, and a first coupling shaft W1 and a second coupling shaft W2.

One of the elements of the first planetary gear set P1 is rotationally fixed to the input shaft WAn. The first planetary gear set is drivingly connected to the prime mover 2 via the input shaft WAn. In other words, at least one further shaft, a gear, a shift element or the like can be arranged in the power flow between the prime mover 2 and the input shaft WAn. Another of the elements of the first planetary gear set P1 is rotationally fixed to the first coupling shaft W1. Another of the elements of the first planetary gear set P1 is rotationally fixed to the second coupling shaft W2.

One of the elements of the second planetary gear set P2 is rotationally fixed to the first coupling shaft W1. Consequently, the first planetary gear set P1 is connected to the second planetary gear set P2 via the first coupling shaft W1. Another of the elements of the second planetary gear set P2 is rotationally fixed to a stationary component of the transmission 1, which is a housing G. Another of the elements of the second planetary gear set P2 is rotationally fixed to the second output shaft WAb2.

One of the elements of the third planetary gear set P3 is rotationally fixed to the second coupling shaft W2. Consequently, the first planetary gear set P1 is connected to the third planetary gear set P3 via the second coupling shaft W2. Another of the elements of the third planetary gear set P3 is rotationally fixed to the first output shaft WAb1. Another of the elements of the third planetary gear set P3 is rotationally fixed to the second output shaft WAb2. Consequently, the second planetary gear set P2 is connected to the third planetary gear set P3 via the second output shaft WAb2.

Figure 3:
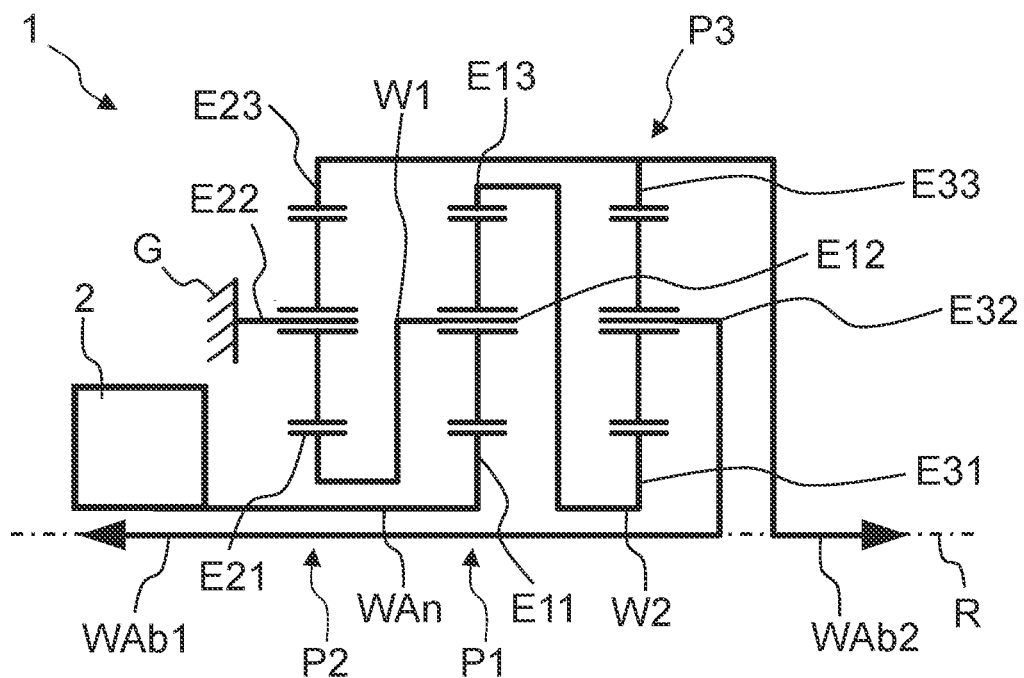
FIG. 3 shows a highly abstract schematic view of the drive device according to example aspects of the invention, according to a first example embodiment.

FIG. 3 schematically shows the drive device including the transmission 1 according to a first example embodiment. Advantages of this first example embodiment are good efficiency and a wide range of ratios of the transmission 1. The transmission 1 has the first planetary gear set P1, the second planetary gear set P2 and the third planetary gear set P3, wherein each of the three planetary gear sets P1, P2, P3 includes a first element E11, E21, E31, a second element E12, E22, E32 and a third element E13, E23, E33. In the present case, the first element E11, E21, E31 of the respective planetary gear set P1, P2, P3 is a sun gear, wherein the second element E12, E22, E32 of the respective planetary gear set P1, P2, P3 is a planet carrier, and wherein the third element E13, E23, E33 of the respective planetary gear set P1, P2, P3 is a ring gear. Each planet carrier supports at least one planet gear, which is meshed with the sun gear and the ring gear of the respective planetary gear set P1, P2, P3. Consequently, each of the three planetary gear sets P1, P2, P3 is a conventional minus or negative planetary gear set. Alternatively, at least one of the three planetary gear sets can be a conventional plus or positive planetary gear set, a minus or negative stepped planetary gear set, a plus or positive stepped planetary gear set including two sun gears, or a plus or positive stepped planetary gear set including two ring gears.

The first element E11 of the first planetary gear set P1 is rotationally fixed to the input shaft WAn, wherein the second element E12 of the first planetary gear set P1 is rotationally fixed to the first coupling shaft W1, and wherein the third element E13 of the first planetary gear set P1 is rotationally fixed to the second coupling shaft W2. The input shaft WAn is connected to the prime mover 2 in the present case. Alternatively, further elements, in particular shafts, gears, shift elements or any other devices can be arranged in the power flow between the prime mover 2 and the input shaft WAn. For example, the power flow between the prime mover 2 and the input shaft WAn can be interrupted by a shift element of this type.

The first element E21 of the second planetary gear set P2 is rotationally fixed to the first coupling shaft W1, wherein the second element E22 of the second planetary gear set P2 is rotationally fixed to a stationary component, which is a housing G, and wherein the third element E23 of the second planetary gear set P2 is rotationally fixed to the second output shaft WAb2.

The first element E31 of the third planetary gear set P3 is rotationally fixed to the second coupling shaft W2, wherein the second element E32 of the third planetary gear set P3 is rotationally fixed to the first output shaft WAb1, and wherein the third element E33 of the third planetary gear set P3 is rotationally fixed to the second output shaft WAb2. Due to this connection, the third planetary gear set P3 rotates as a unit when the motor vehicle is traveling straight ahead, such that the elements of the third planetary gear set P3 do not roll and, as a result, no associated losses are generated.

Consequently, the third element E23 of the second planetary gear set P2 and the third element E33 of the third planetary gear set P3 are connected to each other for conjoint rotation via the second output shaft WAb2. Moreover, the first coupling shaft W1 connects the second element E12 of the first planetary gear set P1 to the first element E21 of the second planetary gear set P2 for conjoint rotation, wherein the second coupling shaft W2 connects the third element E13 of the first planetary gear set P1 to the first element E31 of the third planetary gear set P3 for conjoint rotation.

The first planetary gear set P1 is arranged axially between the second planetary gear set P2 and the third planetary gear set P3, wherein the second planetary gear set P2 is axially adjacent to the prime mover 2. As a result, the drive device is compact. The input shaft WAn rotates in the opposite direction of rotation as compared to the two output shafts WAb1, WAb2. All three planetary gear sets P1, P2, P3 are arranged on a common rotation axis R. The prime mover 2 is arranged coaxially to the rotation axis R. The input shaft WAn is a hollow shaft, wherein the first output shaft WAb1 extends axially through the input shaft WAn and the prime mover 2. The respective output shaft WAb1, WAb2 is connected to a respective wheel of the motor vehicle for conjoint rotation.

Figure 4:
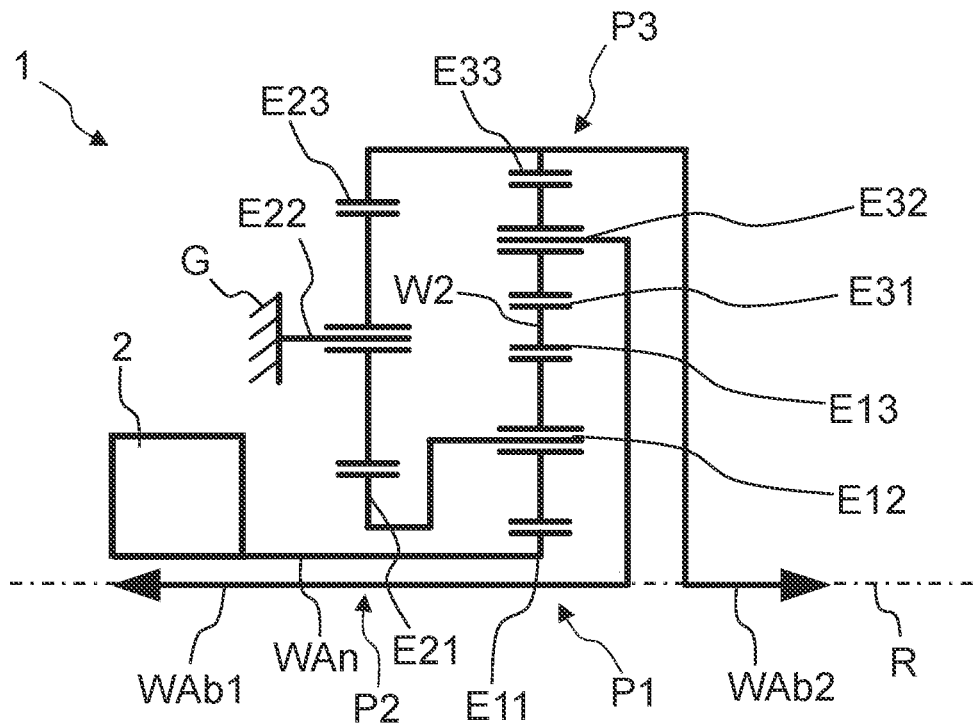
FIG. 4 shows a highly abstract schematic view of a drive device according to example aspects of the invention, according to a second example embodiment.

FIG. 4 shows a second example embodiment of the drive device according to example aspects of the invention. The drive device according to FIG. 4 substantially corresponds to the drive device according to FIG. 3, wherein there is a difference between these two example embodiments with respect to the arrangement of the first and the third planetary gear sets P1, P3. One advantage of this second example embodiment as compared to the first example embodiment is a short axial installation length of the transmission 1. In the present case, the first and the third planetary gear sets P1, P3 are radially nested, wherein the first planetary gear set P1 is arranged radially inward, and wherein the third planetary gear set P3 is arranged radially outward. Consequently, the first planetary gear set P1 is arranged closer to the rotation axis R than the third planetary gear set P3. The elements E11, E12, E13 of the first planetary gear set P1 and the elements E31, E32, E33 of the third planetary gear set P3 overlap in the axial direction. The second coupling shaft W2 is designed as an intermediate gear having an internal toothing and an external toothing and connects the first planetary gear set P1 and the third planetary gear set P3. In other words, the third element E13 of the first planetary gear set P1, the first element E31 of the third planetary gear set P3 and the second coupling shaft W2 are formed in one piece as a common component. The internal toothing of the intermediate gear forms a ring gear for the radially inward, first planetary gear set P1. The external toothing of the intermediate gear forms a sun gear for the radially outward, third planetary gear set P3. The intermediate gear makes the transmission 1 more compact and more lightweight. Moreover, the second and the third planetary gear sets P2, P3 have a common ring gear. In other words, the third element E23 of the second planetary gear set P2 and the third element E33 of the third planetary gear set P3 are formed as a common component having one single toothing. As a result, the assembly work is reduced and the compactness is increased. In particular, the second output shaft WAb2 is formed as one piece with the common ring gear. Otherwise, the example embodiment according to FIG. 4 corresponds to the example embodiment according to FIG. 3, to which reference is made.

Figure 5:
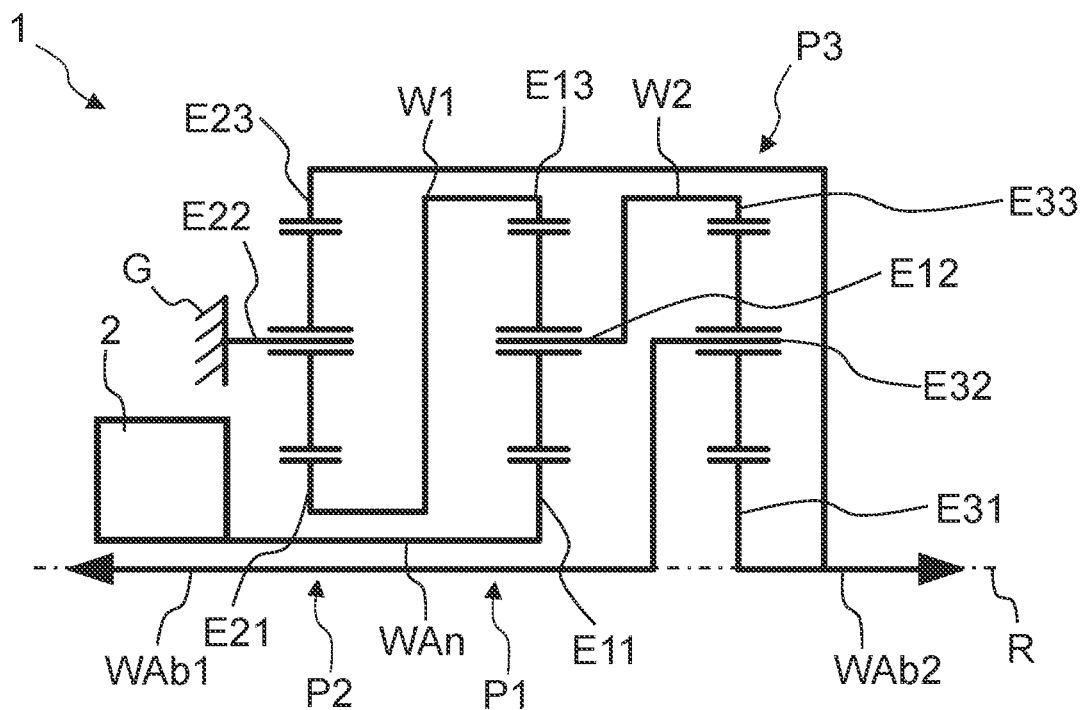
FIG. 5 shows a highly abstract schematic view of a drive device according to example aspects of the invention, according to a third example embodiment.

FIG. 5 shows a third example embodiment of the drive device according to example aspects of the invention. The drive device according to FIG. 5 substantially corresponds to the drive device according to FIG. 3, wherein there is a difference between these two example embodiments with respect to the connection of the first and the third planetary gear sets P1, P3. Advantages of this third example embodiment as compared to the first example embodiment are lower gear set torques and, thus, also a lower load on the particular components of the transmission 1. The input shaft WAn has the same direction of rotation as the two output shafts WAb1, WAb2. In the present case, the first element E11 of the first planetary gear set P1 is rotationally fixed to the input shaft WAn, wherein the second element E12 of the first planetary gear set P1 is rotationally fixed to the second coupling shaft W2, and wherein the third element E13 of the first planetary gear set P1 is rotationally fixed to the first coupling shaft W1. The first element E21 of the second planetary gear set P2 is rotationally fixed to the first coupling shaft W1, wherein the second element E22 of the second planetary gear set P2 is rotationally fixed to a stationary component, which is a housing G, and wherein the third element E23 of the second planetary gear set P2 is rotationally fixed to the second output shaft WAb2. Moreover, the first element E31 of the third planetary gear set P3 is rotationally fixed to the second output shaft WAb2, wherein the second element E32 of the third planetary gear set P3 is rotationally fixed to the first output shaft WAb1, and wherein the third element E33 of the third planetary gear set P3 is rotationally fixed to the second coupling shaft W2. Otherwise, the example embodiment according to FIG. 5 corresponds to the example embodiment according to FIG. 3, to which reference is made.

Figure 6:
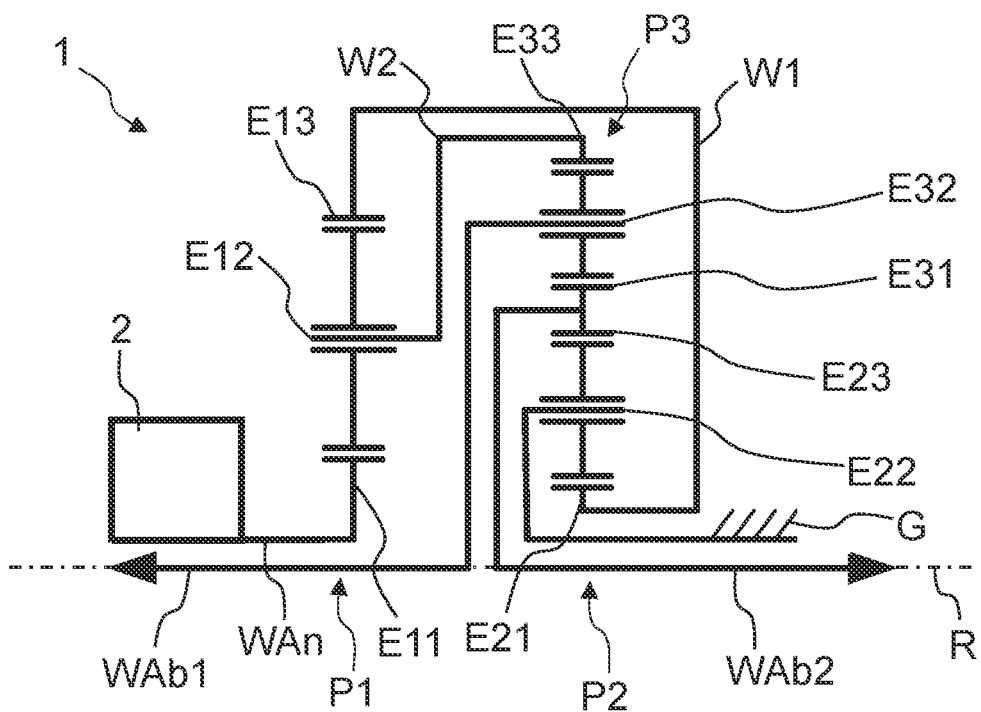
FIG. 6 shows a highly abstract schematic view of a drive device according to example aspects of the invention, according to a fourth example embodiment.

FIG. 6 shows a fourth example embodiment of the drive device according to example aspects of the invention. The drive device according to FIG. 6 substantially corresponds to the drive device according to FIG. 5, wherein there is a difference between these two example embodiments with respect to the arrangement of the second and the third planetary gear sets P2, P3. One advantage of this fourth example embodiment as compared to the third example embodiment is a short axial installation length of the transmission 1. In the present case, the second and the third planetary gear sets P2, P3 are radially nested, wherein the second planetary gear set P2 is arranged radially inward, and wherein the third planetary gear set P3 is arranged radially outward. Consequently, the second planetary gear set P2 is arranged closer to the rotation axis R than the third planetary gear set P3. The elements E21, E22, E23 of the second planetary gear set P2 and the elements E31, E32, E33 of the third planetary gear set P3 overlap in the axial direction. An intermediate gear having an internal toothing and an external toothing is arranged in the power flow between the second planetary gear set P2 and the third planetary gear set P3. The third element E23 of the second planetary gear set P1, the first element E31 of the third planetary gear set P3 and the second output shaft WAb2 are formed as a common component. The internal toothing forms a ring gear for the radially inward, second planetary gear set P2. The external toothing forms a sun gear for the radially outward, third planetary gear set P3. The intermediate gear makes the transmission 1 more compact and more lightweight. Otherwise, the example embodiment according to FIG. 6 corresponds to the example embodiment according to FIG. 5, to which reference is made.

Figure 7:
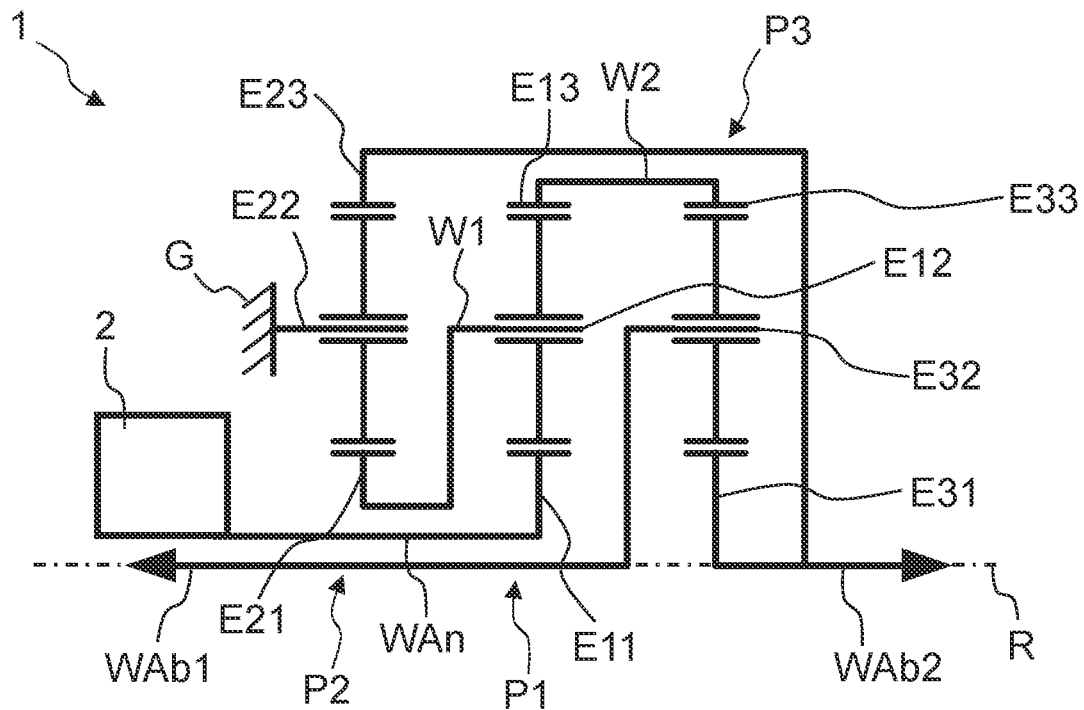
FIG. 7 shows a highly abstract schematic view of a drive device according to example aspects of the invention, according to a fifth example embodiment.

FIG. 7 shows a fifth example embodiment of the drive device according to example aspects of the invention. The drive device according to FIG. 7 substantially corresponds to the drive device according to FIG. 3, wherein there is a difference between these two example embodiments with respect to the connection of the third planetary gear set P3. One advantage of this fifth example embodiment is good efficiency of the transmission 1. In the present case, the first element E11 of the first planetary gear set P1 is rotationally fixed to the input shaft WAn, wherein the second element E12 of the first planetary gear set P1 is rotationally fixed to the first coupling shaft W1, and wherein the third element E13 of the first planetary gear set P1 is rotationally fixed to the second coupling shaft W2. The first element E21 of the second planetary gear set P2 is rotationally fixed to the first coupling shaft W1, wherein the second element E22 of the second planetary gear set P2 is rotationally fixed to a stationary component, which is a housing G, and wherein the third element E23 of the second planetary gear set P2 is rotationally fixed to the second output shaft WAb2. The first element E31 of the third planetary gear set P3 is rotationally fixed to the second output shaft WAb2, wherein the second element E32 of the third planetary gear set P3 is rotationally fixed to the first output shaft WAb1, and wherein the third element E33 of the third planetary gear set P3 is rotationally fixed to the second coupling shaft W2. Moreover, the first and the third planetary gear sets P1, P3 have a common ring gear having one single toothing. In other words, the third element E13 of the first planetary gear set P1, the third element E33 of the third planetary gear set P3 and the second coupling shaft W2 are formed as a common component. As a result, the assembly work is reduced and the compactness is increased. In particular, the second coupling shaft W2 is formed as one piece with the common ring gear. Otherwise, the example embodiment according to FIG. 7 corresponds to the example embodiment according to FIG. 3, to which reference is made.

Figure 8:
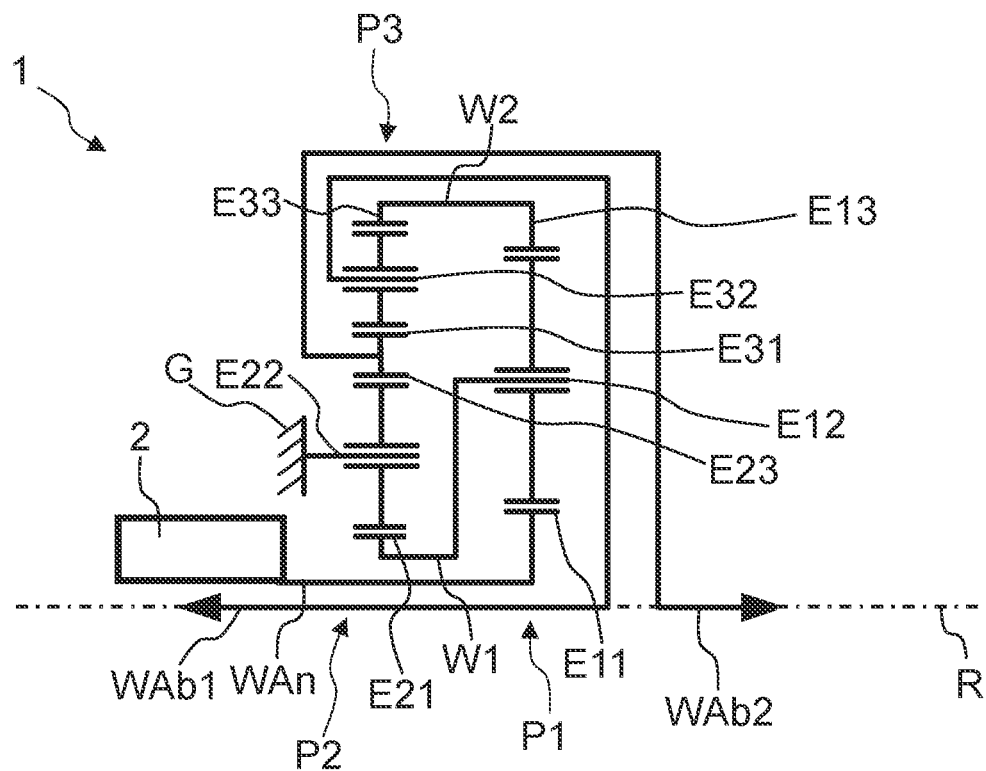
FIG. 8 shows a highly abstract schematic view of a drive device according to example aspects of the invention, according to a sixth example embodiment.

FIG. 8 shows a sixth example embodiment of the drive device according to example aspects of the invention. The drive device according to FIG. 8 substantially corresponds to the drive device according to FIG. 7, wherein there is a difference between these two example embodiments with respect to the arrangement of the second and the third planetary gear sets P2, P3. One advantage of this sixth example embodiment as compared to the fifth example embodiment is a short axial installation length of the transmission 1. In the present case, the second and the third planetary gear sets P2, P3 are radially nested, wherein the second planetary gear set P2 is arranged radially inward, and wherein the third planetary gear set P3 is arranged radially outward. Consequently, the second planetary gear set P2 is arranged closer to the rotation axis R than the third planetary gear set P3. The elements E21, E22, E23 of the second planetary gear set P2 and the elements E31, E32, E33 of the third planetary gear set P3 overlap in the axial direction. An intermediate gear having an internal toothing and an external toothing is arranged in the power flow between the second planetary gear set P2 and the third planetary gear set P3. In the present case, the third element E23 of the second planetary gear set P2 and the first element E31 of the third planetary gear set P3 form a common component. The internal toothing of the intermediate gear forms a ring gear for the radially inward, second planetary gear set P2. The external toothing of the intermediate gear forms a sun gear for the radially outward, third planetary gear set P3. The intermediate gear makes the transmission 1 more compact and more lightweight. Moreover, the first and the third planetary gear sets P1, P3 have a common ring gear having one single toothing. In other words, the third element E13 of the first planetary gear set P1, the third element E33 of the third planetary gear set P3 and the second coupling shaft W2 are formed as a common component. As a result, the assembly work is reduced and the compactness is increased. Otherwise, the example embodiment according to FIG. 8 corresponds to the example embodiment according to FIG. 7, to which reference is made.

Figure 9:
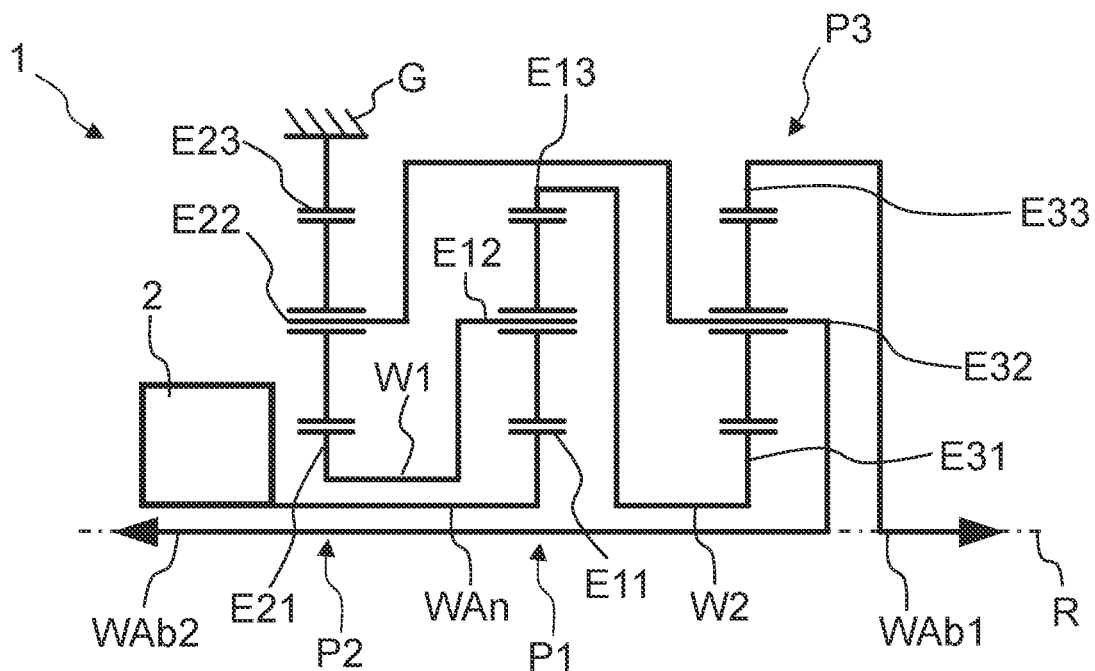
FIG. 9 shows a highly abstract schematic view of a drive device according to example aspects of the invention, according to a seventh example embodiment.

FIG. 9 shows a seventh example embodiment of the drive device according to example aspects of the invention. The drive device according to FIG. 9 substantially corresponds to the drive device according to FIG. 3, wherein there is a difference between these two example embodiments with respect to the connection of the second and the third planetary gear sets P2, P3. One advantage of this seventh example embodiment of the transmission 1 is good efficiency and a wide range of ratios. In the present case, the first element E11 of the first planetary gear set P1 is rotationally fixed to the input shaft WAn, wherein the second element E12 of the first planetary gear set P1 is rotationally fixed to the first coupling shaft W1, and wherein the third element E13 of the first planetary gear set P1 is rotationally fixed to the second coupling shaft W2. The first element E21 of the second planetary gear set P2 is rotationally fixed to the first coupling shaft W1, wherein the second element E22 of the second planetary gear set P2 is rotationally fixed to the second output shaft WAb2, and wherein the third element E23 of the second planetary gear set P2 is rotationally fixed to a stationary component. The first element E31 of the third planetary gear set P3 is rotationally fixed to the second coupling shaft W2, wherein the second element E32 of the third planetary gear set P3 is rotationally fixed to the second output shaft WAb2, and wherein the third element E33 of the third planetary gear set P3 is rotationally fixed to the first output shaft WAb1. The input shaft WAn is a hollow shaft, wherein the second output shaft WAb2 extends axially through the input shaft WAn and the prime mover 2. Otherwise, the example embodiment according to FIG. 9 corresponds to the example embodiment according to FIG. 3, to which reference is made.

Figure 10:
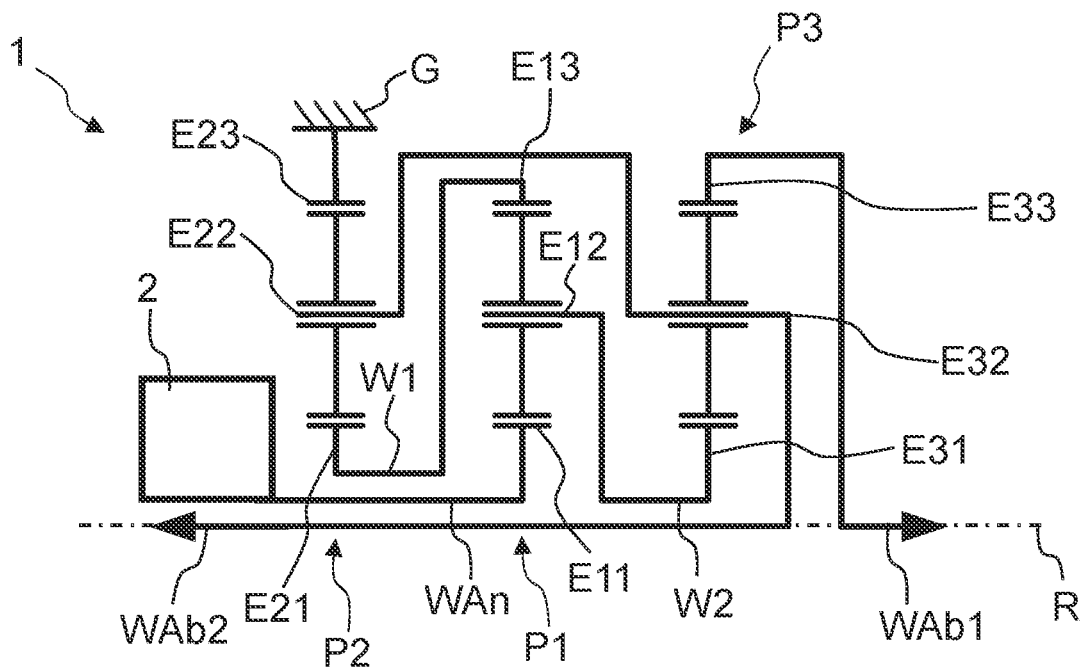
FIG. 10 shows a highly abstract schematic view of a drive device according to example aspects of the invention, according to an eighth example embodiment.

FIG. 10 shows an eighth example embodiment of the drive device according to example aspects of the invention. The drive device according to FIG. 10 substantially corresponds to the drive device according to FIG. 3, wherein there is a difference between these two example embodiments with respect to the connection of the three planetary gear sets P1, P2, P3. In the present case, the first element E11 of the first planetary gear set P1 is rotationally fixed to the input shaft WAn, wherein the second element E12 of the first planetary gear set P1 is rotationally fixed to the second coupling shaft W2, and wherein the third element E13 of the first planetary gear set P1 is rotationally fixed to the first coupling shaft W1. The first element E21 of the second planetary gear set P2 is rotationally fixed to the first coupling shaft W1, wherein the second element E22 of the second planetary gear set P2 is rotationally fixed to the second output shaft WAb2, and wherein the third element E23 of the second planetary gear set P2 is rotationally fixed to a stationary component, which is a housing G. The first element E31 of the third planetary gear set P3 is rotationally fixed to the second coupling shaft W2, wherein the second element E32 of the third planetary gear set P3 is rotationally fixed to the second output shaft WAb2, and wherein the third element E33 of the third planetary gear set P3 is rotationally fixed to the first output shaft WAb1. The input shaft WAn is a hollow shaft, wherein the second output shaft WAb2 extends axially through the input shaft WAn and the prime mover 2. Otherwise, the example embodiment according to FIG. 10 corresponds to the example embodiment according to FIG. 3, to which reference is made.

Figure 11:
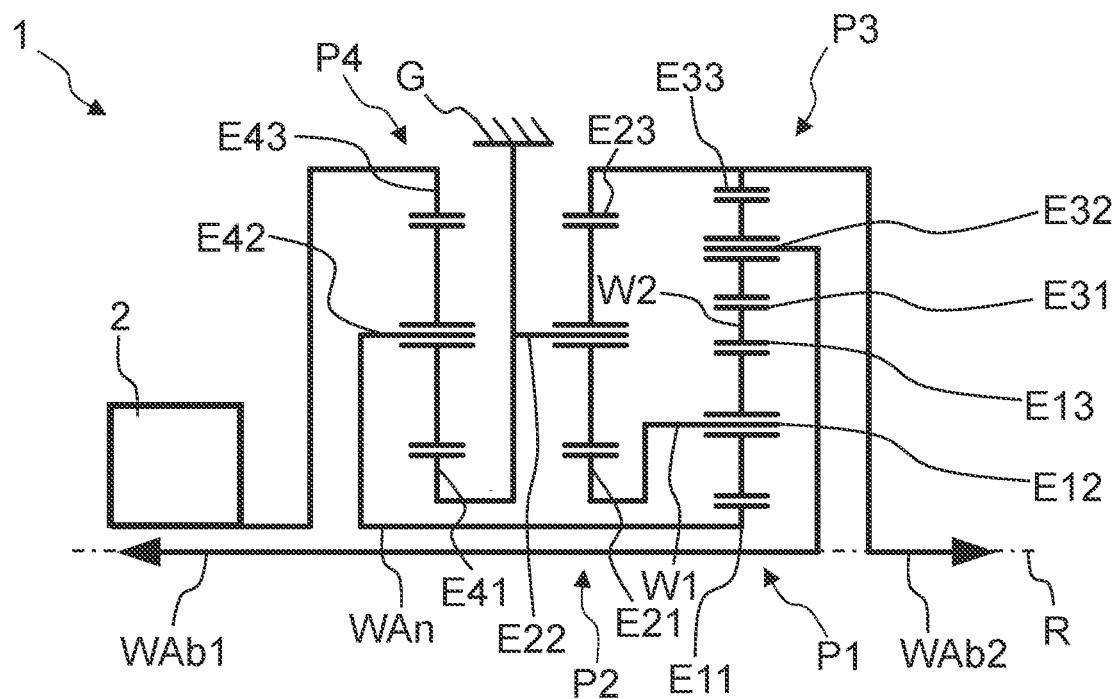
FIG. 11 shows a highly abstract schematic view of a drive device according to example aspects of the invention, according to a ninth example embodiment.

FIG. 11 shows a ninth example embodiment of the drive device according to example aspects of the invention. The drive device according to FIG. 11 substantially corresponds to the drive device according to FIG. 4, wherein there is a difference between these two example embodiments with respect to the arrangement of a constant gear stage in the power flow between the prime mover 2 and the input shaft WAn. In the present case, this pre-ratio is in the form of a fourth planetary gear set P4 and includes a first element 41 in the form of a sun gear, a second element E42 in the form of a planet carrier and a third element E43 in the form of a ring gear. The first element E41 of the fourth planetary gear set P4 is rotationally fixed to the stationary component, which is a housing G. The second element E42 of the fourth planetary gear set P4 is rotationally fixed to the input shaft WAn. The third element E43 of the fourth planetary gear set P4 is drivingly connected to the prime mover 2. Alternatively, the connection of the fourth planetary gear set P4 can also be present in a different way, wherein one of the elements E41, E42, E43 of the fourth planetary gear set P4 is rotationally fixed to the housing G, another of the elements E41, E42, E43 of the fourth planetary gear set P4 is drivingly, i.e., indirectly or directly, connected or connectable to the prime mover 2, and wherein another of the elements E41, E42, E43 of the fourth planetary gear set P4 is rotationally fixed to the input shaft WAn. One advantage of this pre-ratio, which is in the form of a planetary gear set, is that higher ratios can be achieved with the transmission 1. Otherwise, the example embodiment according to FIG. 11 corresponds to the example embodiment according to FIG. 4, to which reference is made.

Figure 12:
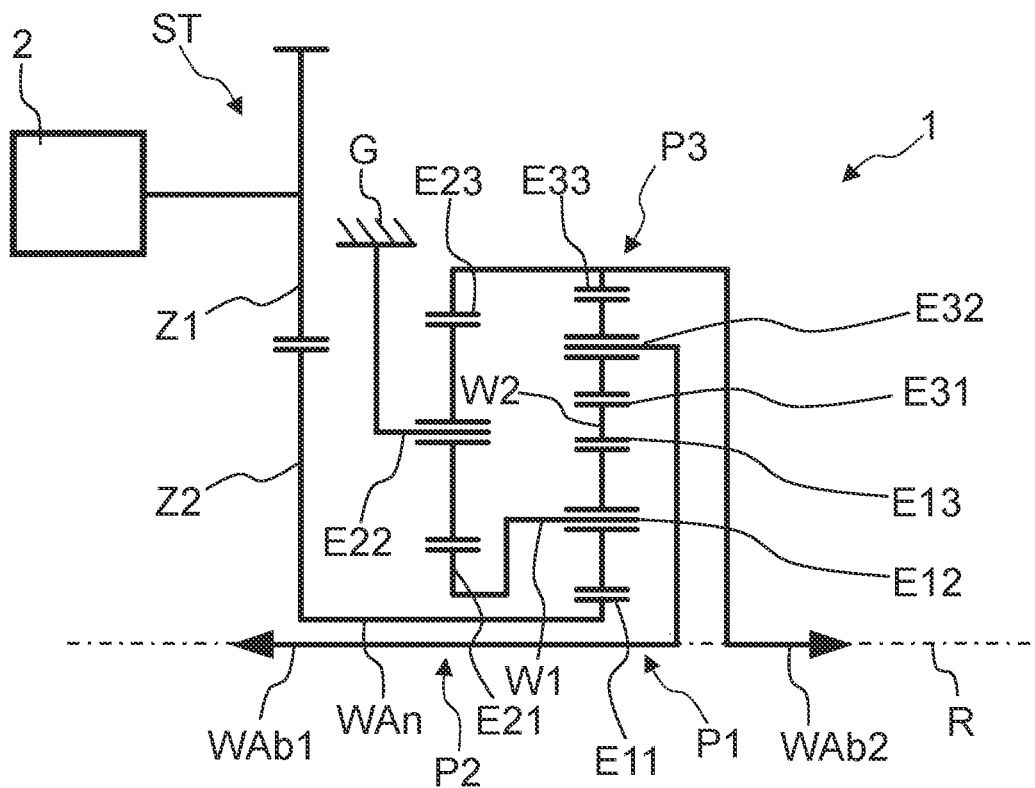
FIG. 12 shows a highly abstract schematic view of a drive device according to example aspects of the invention, according to a tenth example embodiment.

FIG. 12 shows a tenth example embodiment of the drive device according to example aspects of the invention. The drive device according to FIG. 12 substantially corresponds to the drive device according to FIG. 4, wherein there is a difference between these two example embodiments with respect to the arrangement of a constant gear stage in the power flow between the prime mover 2 and the input shaft WAn. In the present case, this pre-ratio is in the form of a spur gear stage ST and includes a first gear Z1, which is drivingly connected to the prime mover 2, and a second gear Z2, which is rotationally fixed to the input shaft WAn. A center distance of the prime mover 2 to the rotation axis R can be set via the diameters of the two gears Z1, Z2 of the spur gear stage ST. Consequently, the prime mover 2 is arranged axially parallel to the input shaft WAn and to the two output shafts WAb1, WAb2. One advantage of this pre-ratio, which is in the form of a spur gear stage ST, is that higher ratios can be achieved with the transmission 1. Otherwise, the example embodiment according to FIG. 12 corresponds to the example embodiment according to FIG. 4, to which reference is made.

Figure 13:
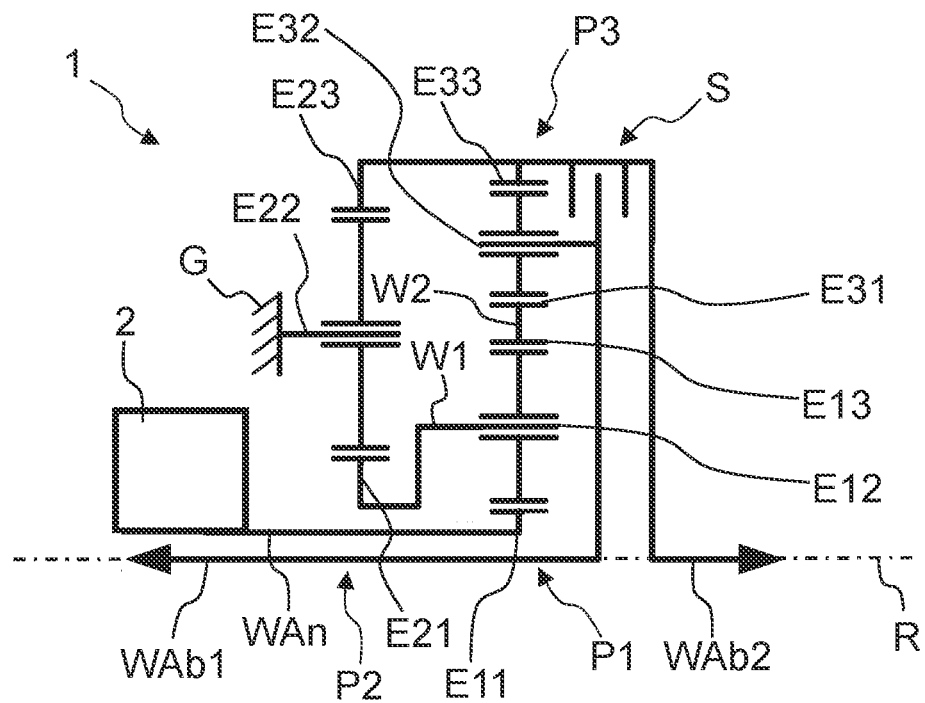
FIG. 13 shows a highly abstract schematic view of a drive device according to example aspects of the invention, according to an eleventh example embodiment.

FIG. 13 shows an eleventh example embodiment of the drive device according to example aspects of the invention. The drive device according to FIG. 13 substantially corresponds to the drive device according to FIG. 4, wherein there is a difference between these two example embodiments with respect to the arrangement of a shift element S for generating an interlock between the two output shafts WAb1, WAb2. In the present case, the shift element S is a friction-locking shift element and, in a partially engaged state, generates a torque between the two output shafts WAb1, WAb2. In a completely engaged state of the shift element S, the two output shafts WAb1, WAb2 are connected to each other for conjoint rotation via the shift element S. In completely disengaged state of the shift element S, torque is not transmitted between the two output shafts WAb1, WAb2 via the shift element S. For example, the shift element S can have one or multiple friction surfaces acting in parallel. Alternatively, the shift element S can have one or multiple conical friction surfaces. A transmission 1 that includes a limited-slip differential of this type allows, in particular, for sporty driving. Otherwise, the example embodiment according to FIG. 13 corresponds to the example embodiment according to FIG. 4, to which reference is made.

Figure 14:
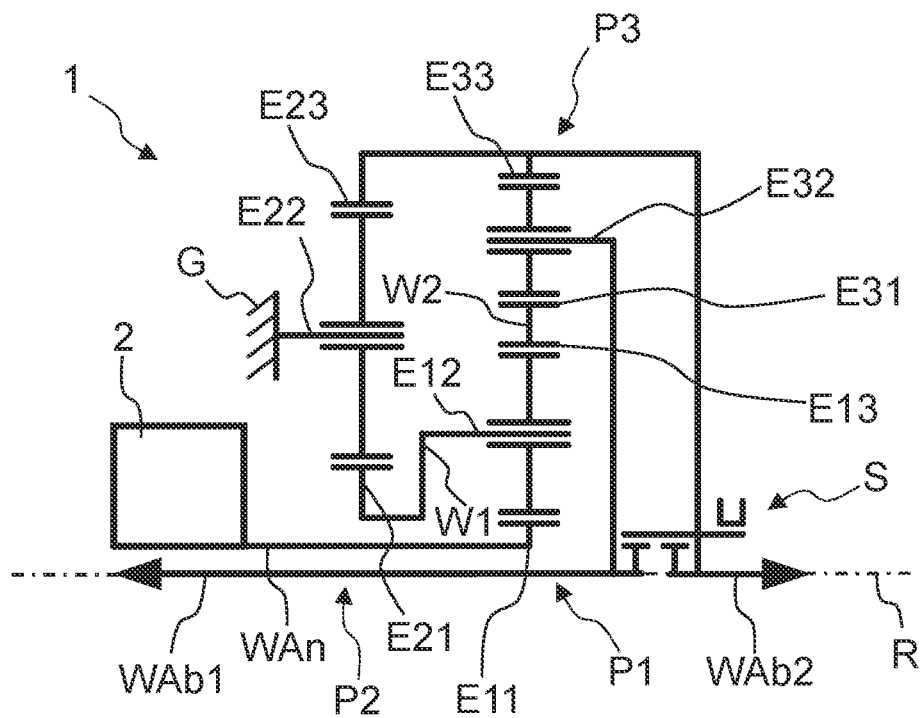
FIG. 14 shows a highly abstract schematic view of a drive device according to example aspects of the invention, according to a twelfth example embodiment.

FIG. 14 shows a twelfth example embodiment of the drive device according to example aspects of the invention. The drive device according to FIG. 14 substantially corresponds to the drive device according to FIG. 4, wherein there is a difference between these two example embodiments with respect to the arrangement of a shift element S for generating an interlock between the two output shafts WAb1, WAb2. In the present case, the shift element S is a form-locking shift element and, in an engaged state, generates a locking torque between the two output shafts WAb1, WAb2 by connecting the two output shafts WAb1, WAb2 to each other for conjoint rotation. In a disengaged state of the shift element S, torque is not generated between the two output shafts WAb1, WAb2. For example, the shift element S can have multiple form-locking dogs. A transmission 1 that includes a limited-slip differential of this type supports, in particular, the traction during off-road driving. Otherwise, the example embodiment according to FIG. 14 corresponds to the example embodiment according to FIG. 4, to which reference is made.

Figure 15:
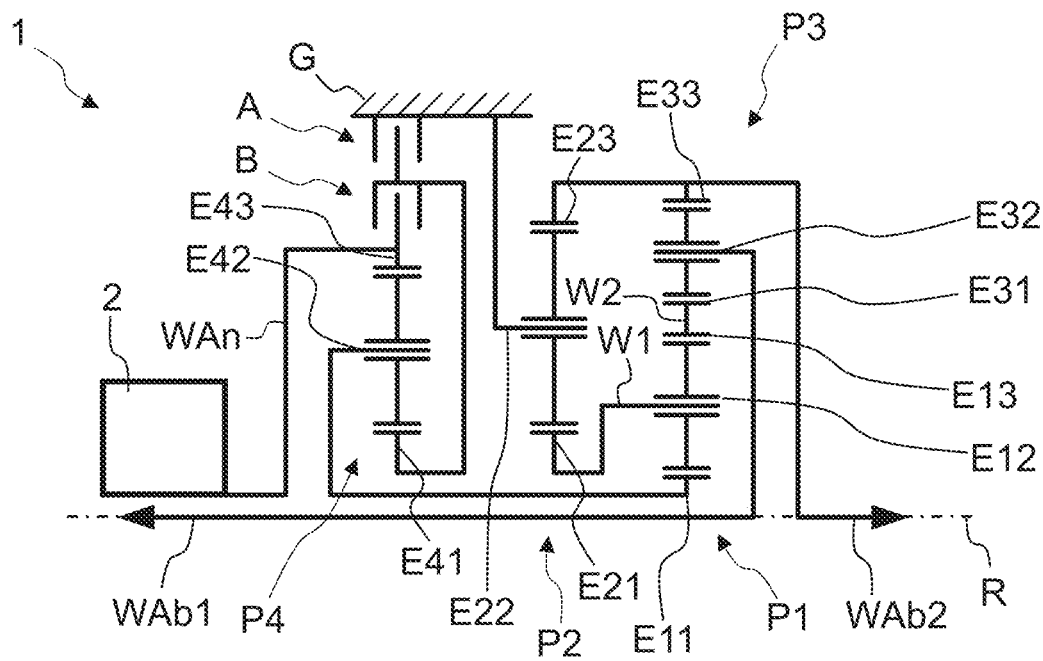
FIG. 15 shows a highly abstract schematic view of a drive device according to example aspects of the invention, according to a thirteenth example embodiment.

FIG. 15 shows a thirteenth example embodiment of the drive device according to example aspects of the invention. The drive device according to FIG. 15 substantially corresponds to the drive device according to FIG. 11, wherein there is a difference between these two example embodiments with respect to the arrangement of a first shift element A, which is provided for shifting a first gear, and a second shift element B, which is provided for shifting a second gear, in the power flow between the prime mover 2 and the input shaft WAn. In the present case, both shift elements A, B are friction-locking shift elements, for example, multi-disk clutches, and allow for power shiftability. In an engaged state of the first shift element A and a disengaged state of the second shift element B, the first element E41 of the fourth planetary gear set P4 is rotationally fixed to the housing G and sets a first ratio. In a disengaged state of the first shift element A and an engaged state of the second shift element B, the fourth planetary gear set P4 is interlocked by connecting the first element E41 of the fourth planetary gear set P4 and the third element E43 of the fourth planetary gear set P4 for conjoint rotation and, thus, a second ratio is set. One advantage of an upstream 2-speed gear-change device of this type is that high ratios are made possible at a high maximum speed. Otherwise, the example embodiment according to FIG. 15 corresponds to the example embodiment according to FIG. 11, to which reference is made.

FIGS. 16 through 19 show different example embodiments of planetary gear sets. At least one of the planetary gear sets of the transmission according to the invention can be a conventional plus or positive planetary gear set, a minus or negative stepped planetary gear set, a plus or positive stepped planetary gear set including two sun gears, or a plus or positive stepped planetary gear set including two ring gears, instead of a conventional minus or negative planetary gear set.

Figure 16:
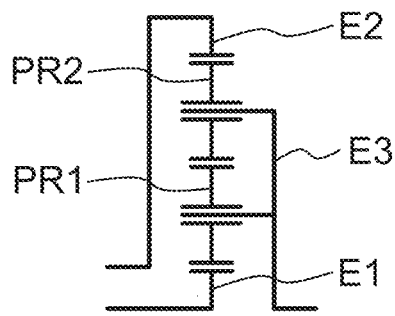
FIG. 16 shows a highly abstract schematic view of a plus or positive planetary gear set.

FIG. 16 shows a plus planetary gear set. The first element E1 of the plus planetary gear set is a sun gear, wherein the second element E2 of the plus planetary gear set is a ring gear, and wherein the third element E3 of the plus planetary gear set is a planet carrier. The planet carrier of the plus planetary gear set guides at least one planet gear pair, which consists of a first planet gear PR1 and a second planet gear PR2. The first planet gear PR1 is meshed with the internal sun gear and the second planet gear PR2 is meshed with the surrounding ring gear. Moreover, the two planet gears PR1, PR2 of a planet gear pair are also in mesh with one another.

Figure 17:
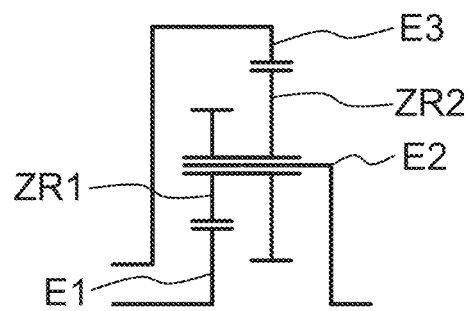
FIG. 17 shows a highly abstract schematic view of a minus or negative stepped planetary gear set.

FIG. 17 shows a minus stepped planetary gear set. The first element E1 of the minus stepped planetary gear set is a sun gear in the present case and, alternatively, can be a ring gear. The second element E2 of the minus stepped planetary gear set is a planet carrier. The third element E3 of the minus stepped planetary gear set is a ring gear in the present case and can be a sun gear if the first element E1 of the minus stepped planetary gear set is a ring gear. The planet carrier of the minus stepped planetary gear set guides at least one stepped planetary gear, which consists of a first gear ZR1 and a second gear ZR2, wherein the two gears ZR1, ZR2 are connected to each other for conjoint rotation and as one piece. In the present case, the first gear ZR1 of the stepped planetary gear has a smaller diameter than the second gear ZR2 of the stepped planetary gear. The first gear ZR1 of the stepped planetary gear is meshed with the internal sun gear and the second gear ZR2 of the stepped planetary gear is meshed with the surrounding ring gear.

Figure 18:
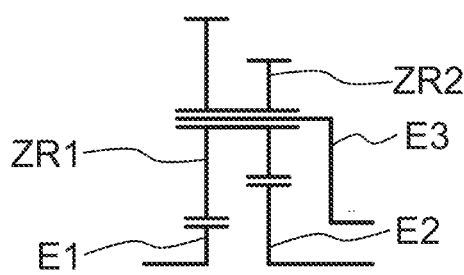
FIG. 18 shows a highly abstract schematic view of a plus or positive stepped planetary gear set that includes two sun gears.

FIG. 18 shows a plus stepped planetary gear set that includes two sun gears. The first element E1 of the plus stepped planetary gear set is a first sun gear. The second element E2 of the plus stepped planetary gear set is a second sun gear. The third element E3 of the plus stepped planetary gear set is a planet carrier. The planet carrier of the plus stepped planetary gear set guides at least one stepped planetary gear, which consists of a first gear ZR1 and a second gear ZR2, wherein the two gears ZR1, ZR2 are connected to each other for conjoint rotation and as one piece. In the present case, the first gear ZR1 of the stepped planetary gear has a larger diameter than the second gear ZR2 of the stepped planetary gear. The first gear ZR1 of the stepped planetary gear is meshed with the first sun gear and the second gear ZR2 of the stepped planetary gear is meshed with the second sun gear.

Figure 19:
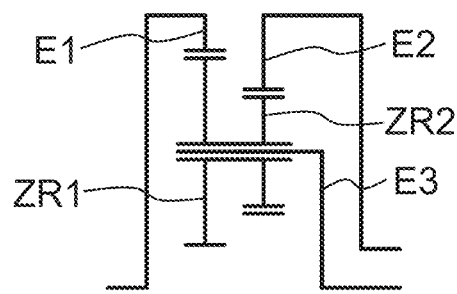
FIG. 19 shows a highly abstract schematic view of a plus or positive stepped planetary gear set that includes two ring gears.

FIG. 19 shows a plus stepped planetary gear set that includes two ring gears. The first element E1 of the plus stepped planetary gear set is a first ring gear. The second element E2 of the plus stepped planetary gear set is a second ring gear. The third element E3 of the plus stepped planetary gear set is a planet carrier. The planet carrier of the plus stepped planetary gear set guides at least one stepped planetary gear, which consists of a first gear ZR1 and a second gear ZR2, wherein the two gears ZR1, ZR2 are connected to each other for conjoint rotation and as one piece. In the present case, the first gear ZR1 of the stepped planetary gear has a larger diameter than the second gear ZR2 of the stepped planetary gear. The first gear ZR1 of the stepped planetary gear is meshed with the first ring gear and the second gear ZR2 of the stepped planetary gear is meshed with the second ring gear.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission
2 prime mover
W1 first coupling shaft
W2 second coupling shaft
WAn input shaft
WAb1 first output shaft
WAb2 second output shaft
G housing
A first shift element
B second shift element
S shift element
R rotation axis
P1 first planetary gear set
E11 first element of the first planetary gear set E12 second element of the first planetary gear set
E13 third element of the first planetary gear set
P2 second planetary gear set
E21 first element of the second planetary gear set
E22 second element of the second planetary gear set
E23 third element of the second planetary gear set
P3 third planetary gear set
E31 first element of the third planetary gear set
E32 second element of the third planetary gear set
E33 third element of the third planetary gear set
P4 fourth planetary gear set
E41 first element of the fourth planetary gear set
E42 second element of the fourth planetary gear set
E43 third element of the fourth planetary gear set
E1 first element
E2 second element
E3 third element
PR1 first planet gear
PR2 second planet gear
ZR1 first gear of the stepped planetary gear
ZR2 second gear of the stepped planetary gear
ST spur gear stage
Z1 first gear of the spur gear stage
Z2 second gear of the spur gear stage
100 motor vehicle
101 first wheel axle
102 second wheel axle
R1 wheel
R2 wheel
R3 wheel
R4 wheel

The invention claimed is:

1. A transmission (1) for a motor vehicle (100), comprising:
a first planetary gear set (P1), a second planetary gear set (P2) and a third planetary gear set (P3), each of the first, second, and third planetary gear set (P1, P2, P3) respectively comprising a first element (E11, E21, E31), a second element (E12, E22, E32) and a third element (E13, E23, E33);
an input shaft (WAn) configured for connecting the transmission (1) to a prime mover (2) of the motor vehicle (100);
a first output shaft (WAb1) and a second output shaft (WAb2) configured for connecting the transmission (1) to a respective wheel (R1, R2) of the motor vehicle (100);
a first coupling shaft (W1) and a second coupling shaft (W2) configured for connecting two elements of two of the first, second, and third planetary gear sets (P1, P2, P3) for conjoint rotation;
wherein one of the first, second, and thirds elements (E11, E21, E31) of the first planetary gear set (P1) is rotationally fixed to the input shaft (WAn), another of the first, second, and thirds elements (E11, E21, E31) of the first planetary gear set (P1) is rotationally fixed to the first coupling shaft (W1), and another of the first, second, and thirds elements (E11, E21, E31) of the first planetary gear set (P1) is rotationally fixed to the second coupling shaft (W2),
wherein one of the first, second, and thirds elements (E12, E22, E32) of the second planetary gear set (P2) is rotationally fixed to the first coupling shaft (W1), another of the first, second, and thirds elements (E12, E22, E32) of the second planetary gear set (P2) is rotationally fixed to a stationary component, and another of the first, second, and thirds elements (E12, E22, E32) of the second planetary gear set (P2) is rotationally fixed to the second output shaft (WAb2),
wherein one of the first, second, and thirds elements (E13, E23, E33) of the third planetary gear set (P3) is rotationally fixed to the second coupling shaft (W2), another of the first, second, and thirds elements (E13, E23, E33) of the third planetary gear set (P3) is rotationally fixed to the first output shaft (WAb1), and another of the first, second, and thirds elements (E13, E23, E33) of the third planetary gear set (P3) is rotationally fixed to the second output shaft (WAb2),
wherein the first element (E11) of the first planetary gear set (P1) is rotationally fixed to the input shaft (WAn), the second element (E12) of the first planetary gear set (P1) is rotationally fixed to the first coupling shaft (W1), and the third element (E13) of the first planetary gear set (P1) is rotationally fixed to the second coupling shaft (W2),
wherein the first element (E21) of the second planetary gear set (P2) is rotationally fixed to the first coupling shaft (W1), the second element (E22) of the second planetary gear set (P2) is rotationally fixed to a stationary component, and the third element (E23) of the second planetary gear set (P2) is rotationally fixed to the second output shaft (WAb2), and
wherein the first element (E31) of the third planetary gear set (P3) is rotationally fixed to the second coupling shaft (W2), the second element (E32) of the third planetary gear set (P3) is rotationally fixed to the first output shaft (WAb1), and the third element (E33) of the third planetary gear set (P3) is rotationally fixed to the second output shaft (WAb2).

2. The transmission (1) of claim 1, wherein two of the first, second, and third planetary gear sets (P1, P2, P3) are radially nested.

3. The transmission (1) of claim 1, wherein one of the first and second coupling shafts (W1, W2) or one of the first and second output shafts (WAb1, WAb2) is formed as one piece with the element of the respective planetary gear set (P1, P2, P3) connected thereto.

4. The transmission (1) of claim 1, wherein at least one of the first, second, and third planetary gear sets (P1, P2, P3) is a minus planetary gear set, wherein the first element (E11, E21, E31) of the minus planetary gear set is a sun gear, wherein the second element (E12, E22, E32) of the minus planetary gear set is a planet carrier, wherein the third element (E13, E23, E33) of the minus planetary gear set is a ring gear.

5. The transmission (1) of claim 1, wherein at least one of the first, second, and third planetary gear sets (P1, P2, P3) is a plus planetary gear set, wherein the first element (E11, E21, E31) of the plus planetary gear set is a sun gear, wherein the second element (E12, E22, E32) of the plus planetary gear set is a ring gear, wherein the third element (E13, E23, E33) of the plus planetary gear set is a planet carrier.

6. The transmission (1) of claim 1, further comprising a constant gear stage arranged in a power flow upstream from the input shaft (WAn).

7. The transmission (1) of claim 1, further comprising a first shift element (A) for shifting a first gear and a second shift element (B) for shifting a second gear are arranged in a power flow upstream-downstream from the input shaft (WAn).

8. The transmission (1) of claim 1, further comprising a shift element (S) for generating an interlock arranged between the first and second output shafts (WAb1, WAb2).

9. A drive device, comprising a prime mover (2) and the transmission (1) of claim 1.

10. A motor vehicle (100), comprising the drive device of claim 9.

11. A transmission (1) for a motor vehicle (100), comprising:
- a first planetary gear set (P1), a second planetary gear set (P2) and a third planetary gear set (P3), each of the first, second, and third planetary gear set (P1, P2, P3) respectively comprising a first element (E11, E21, E31), a second element (E12, E22, E32) and a third element (E13, E23, E33);
- an input shaft (WAn) configured for connecting the transmission (1) to a prime mover (2) of the motor vehicle (100);
- a first output shaft (WAb1) and a second output shaft (WAb2) configured for connecting the transmission (1) to a respective wheel (R1, R2) of the motor vehicle (100);
- a first coupling shaft (W1) and a second coupling shaft (W2) configured for connecting two elements of two of the first, second, and third planetary gear sets (P1, P2, P3) for conjoint rotation;
- wherein one of the first, second, and thirds elements (E11, E21, E31) of the first planetary gear set (P1) is rotationally fixed to the input shaft (WAn), another of the first, second, and thirds elements (E11, E21, E31) of the first planetary gear set (P1) is rotationally fixed to the first coupling shaft (W1), and another of the first, second, and thirds elements (E11, E21, E31) of the first planetary gear set (P1) is rotationally fixed to the second coupling shaft (W2),
- wherein one of the first, second, and thirds elements (E12, E22, E32) of the second planetary gear set (P2) is rotationally fixed to the first coupling shaft (W1), another of the first, second, and thirds elements (E12, E22, E32) of the second planetary gear set (P2) is rotationally fixed to a stationary component, and another of the first, second, and thirds elements (E12, E22, E32) of the second planetary gear set (P2) is rotationally fixed to the second output shaft (WAb2),
- wherein one of the first, second, and thirds elements (E13, E23, E33) of the third planetary gear set (P3) is rotationally fixed to the second coupling shaft (W2), another of the first, second, and thirds elements (E13, E23, E33) of the third planetary gear set (P3) is rotationally fixed to the first output shaft (WAb1), and another of the first, second, and thirds elements (E13, E23, E33) of the third planetary gear set (P3) is rotationally fixed to the second output shaft (WAb2),
- wherein the first element (E11) of the first planetary gear set (P1) is rotationally fixed to the input shaft (WAn), the second element (E12) of the first planetary gear set (P1) is rotationally fixed to the second coupling shaft (W2), and the third element (E13) of the first planetary gear set (P1) is rotationally fixed to the first coupling shaft (W1),
- wherein the first element (E21) of the second planetary gear set (P2) is rotationally fixed to the first coupling shaft (W1), the second element (E22) of the second planetary gear set (P2) is rotationally fixed to a stationary component, and the third element (E23) of the second planetary gear set (P2) is rotationally fixed to the second output shaft (WAb2), and
- wherein the first element (E31) of the third planetary gear set (P3) is rotationally fixed to the second output shaft (WAb2), the second element (E32) of the third planetary gear set (P3) is rotationally fixed to the first output shaft (WAb1), and the third element (E33) of the third planetary gear set (P3) is rotationally fixed to the second coupling shaft (W2).

12. The transmission (1) of claim 11, wherein two of the first, second, and third planetary gear sets (P1, P2, P3) are radially nested.

13. The transmission (1) of claim 11, further comprising a constant gear stage arranged in a power flow upstream from the input shaft (WAn).

14. The transmission (1) of claim 11, further comprising a first shift element (A) for shifting a first gear and a second shift element (B) for shifting a second gear are arranged in a power flow downstream from the input shaft (WAn).

15. The transmission (1) of claim 11, further comprising a shift element (S) for generating an interlock arranged between the first and second output shafts (WAb1, WAb2).

16. A transmission (1) for a motor vehicle (100), comprising:
- a first planetary gear set (P1), a second planetary gear set (P2) and a third planetary gear set (P3), each of the first, second, and third planetary gear set (P1, P2, P3) respectively comprising a first element (E11, E21, E31), a second element (E12, E22, E32) and a third element (E13, E23, E33);
- an input shaft (WAn) configured for connecting the transmission (1) to a prime mover (2) of the motor vehicle (100);
- a first output shaft (WAb1) and a second output shaft (WAb2) configured for connecting the transmission (1) to a respective wheel (R1, R2) of the motor vehicle (100);
- a first coupling shaft (W1) and a second coupling shaft (W2) configured for connecting two elements of two of the first, second, and third planetary gear sets (P1, P2, P3) for conjoint rotation;
- wherein one of the first, second, and thirds elements (E11, E21, E31) of the first planetary gear set (P1) is rotationally fixed to the input shaft (WAn), another of the first, second, and thirds elements (E11, E21, E31) of the first planetary gear set (P1) is rotationally fixed to the first coupling shaft (W1), and another of the first, second, and thirds elements (E11, E21, E31) of the first planetary gear set (P1) is rotationally fixed to the second coupling shaft (W2),
- wherein one of the first, second, and thirds elements (E12, E22, E32) of the second planetary gear set (P2) is rotationally fixed to the first coupling shaft (W1), another of the first, second, and thirds elements (E12, E22, E32) of the second planetary gear set (P2) is rotationally fixed to a stationary component, and another of the first, second, and thirds elements (E12, E22, E32) of the second planetary gear set (P2) is rotationally fixed to the second output shaft (WAb2),
- wherein one of the first, second, and thirds elements (E13, E23, E33) of the third planetary gear set (P3) is rotationally fixed to the second coupling shaft (W2), another of the first, second, and thirds elements (E13, E23, E33) of the third planetary gear set (P3) is rotationally fixed to the first output shaft (WAb1), and another of the first, second, and thirds elements (E13, E23, E33) of the third planetary gear set (P3) is rotationally fixed to the second output shaft (WAb2),
- wherein the first element (E11) of the first planetary gear set (P1) is rotationally fixed to the input shaft (WAn), the second element (E12) of the first planetary gear set (P1) is rotationally fixed to the first coupling shaft (W1), and the third element (E13) of the first planetary gear set (P1) is rotationally fixed to the second coupling shaft (W2), wherein the first element (E21) of the second planetary gear set (P2) is rotationally fixed to the first coupling shaft (W1), the second element (E22) of the second planetary gear set (P2) is rotationally fixed to a stationary component, and the third element (E23) of the second planetary gear set (P2) is rotationally fixed to the second output shaft (WAb2), and wherein the first element (E31) of the third planetary gear set (P3) is rotationally fixed to the second output shaft (WAb2), the second element (E32) of the third planetary gear set (P3) is rotationally fixed to the first output shaft (WAb1), and the third element (E33) of the third planetary gear set (P3) is rotationally fixed to the second coupling shaft (W2).

17. The transmission (1) of claim 16, wherein two of the first, second, and third planetary gear sets (P1, P2, P3) are radially nested.

18. The transmission (1) of claim 16, further comprising a constant gear stage arranged in a power flow upstream from the input shaft (WAn).

19. The transmission (1) of claim 16, further comprising a first shift element (A) for shifting a first gear and a second shift element (B) for shifting a second gear are arranged in a power flow downstream from the input shaft (WAn).

20. The transmission (1) of claim 16, further comprising a shift element (S) for generating an interlock arranged between the first and second output shafts (WAb1, WAb2).

21. A transmission (1) for a motor vehicle (100), comprising:
a first planetary gear set (P1), a second planetary gear set (P2) and a third planetary gear set (P3), each of the first, second, and third planetary gear set (P1, P2, P3) respectively comprising a first element (E11, E21, E31), a second element (E12, E22, E32) and a third element (E13, E23, E33);
an input shaft (WAn) configured for connecting the transmission (1) to a prime mover (2) of the motor vehicle (100);
a first output shaft (WAb1) and a second output shaft (WAb2) configured for connecting the transmission (1) to a respective wheel (R1, R2) of the motor vehicle (100);
a first coupling shaft (W1) and a second coupling shaft (W2) configured for connecting two elements of two of the first, second, and third planetary gear sets (P1, P2, P3) for conjoint rotation;
wherein one of the first, second, and thirds elements (E11, E21, E31) of the first planetary gear set (P1) is rotationally fixed to the input shaft (WAn), another of the first, second, and thirds elements (E11, E21, E31) of the first planetary gear set (P1) is rotationally fixed to the first coupling shaft (W1), and another of the first, second, and thirds elements (E11, E21, E31) of the first planetary gear set (P1) is rotationally fixed to the second coupling shaft (W2),
wherein one of the first, second, and thirds elements (E12, E22, E32) of the second planetary gear set (P2) is rotationally fixed to the first coupling shaft (W1) another of the first, second, and thirds elements (E12, E22, E32) of the second planetary gear set (P2) is rotationally fixed to a stationary component, and another of the first, second, and thirds elements (E12, E22, E32) of the second planetary gear set (P2) is rotationally fixed to the second output shaft (WAb2),
wherein one of the first, second, and thirds elements (E13, E23, E33) of the third planetary gear set (P3) is rotationally fixed to the second coupling shaft (W2), another of the first, second, and thirds elements (E13, E23, E33) of the third planetary gear set (P3) is rotationally fixed to the first output shaft (WAb1), and another of the first, second, and thirds elements (E13, E23, E33) of the third planetary gear set (P3) is rotationally fixed to the second output shaft (WAb2),
wherein the first element (E11) of the first planetary gear set (P1) is rotationally fixed to the input shaft (WAn), the second element (E12) of the first planetary gear set (P1) is rotationally fixed to the first coupling shaft (W1), and the third element (E13) of the first planetary gear set (P1) is rotationally fixed to the second coupling shaft (W2),
wherein the first element (E21) of the second planetary gear set (P2) is rotationally fixed to the first coupling shaft (W1), the second element (E22) of the second planetary gear set (P2) is rotationally fixed to the second output shaft (WAb2), and the third element (E23) of the second planetary gear set (P2) is rotationally fixed to a stationary component, and
wherein the first element (E31) of the third planetary gear set (P3) is rotationally fixed to the second coupling shaft (W2), the second element (E32) of the third planetary gear set (P3) is rotationally fixed to the second output shaft (WAb2), and the third element (E33) of the third planetary gear set (P3) is rotationally fixed to the first output shaft (WAb1).

22. The transmission (1) of claim 21, wherein two of the first, second, and third planetary gear sets (P1, P2, P3) are radially nested.

23. The transmission (1) of claim 21, further comprising a constant gear stage arranged in a power flow downstream from the input shaft (WAn).

24. The transmission (1) of claim 21, further comprising a first shift element (A) for shifting a first gear and a second shift element (B) for shifting a second gear are arranged in a power flow upstream from the input shaft (WAn).

25. The transmission (1) of claim 21, further comprising a shift element (S) for generating an interlock arranged between the first and second output shafts (WAb1, WAb2).

26. A transmission (1) for a motor vehicle (100), comprising:
a first planetary gear set (P1), a second planetary gear set (P2) and a third planetary gear set (P3), each of the first, second, and third planetary gear set (P1, P2, P3) respectively comprising a first element (E11, E21, E31), a second element (E12, E22, E32) and a third element (E13, E23, E33);
an input shaft (WAn) configured for connecting the transmission (1) to a prime mover (2) of the motor vehicle (100);
a first output shaft (WAb1) and a second output shaft (WAb2) configured for connecting the transmission (1) to a respective wheel (R1, R2) of the motor vehicle (100);
a first coupling shaft (W1) and a second coupling shaft (W2) configured for connecting two elements of two of the first, second, and third planetary gear sets (P1, P2, P3) for conjoint rotation;
wherein one of the first, second, and thirds elements (E11, E21, E31) of the first planetary gear set (P1) is rotationally fixed to the input shaft (WAn), another of the first, second, and thirds elements (E11, E21, E31) of the first planetary gear set (P1) is rotationally fixed to the first coupling shaft (W1), and another of the first, second, and thirds elements (E11, E21, E31) of the first planetary gear set (P1) is rotationally fixed to the second coupling shaft (W2), wherein one of the first, second, and thirds elements (E12, E22, E32) of the second planetary gear set (P2) is rotationally fixed to the first coupling shaft (W1), another of the first, second, and thirds elements (E12, E22, E32) of the second planetary gear set (P2) is rotationally fixed to a stationary component, and another of the first, second, and thirds elements (E12, E22, E32) of the second planetary gear set (P2) is rotationally fixed to the second output shaft (WAb2), wherein one of the first, second, and thirds elements (E13, E23, E33) of the third planetary gear set (P3) is rotationally fixed to the second coupling shaft (W2), another of the first, second, and thirds elements (E13, E23, E33) of the third planetary gear set (P3) is rotationally fixed to the first output shaft (WAb1), and another of the first, second, and thirds elements (E13, E23, E33) of the third planetary gear set (P3) is rotationally fixed to the second output shaft (WAb2), wherein the first element (E11) of the first planetary gear set (P1) is rotationally fixed to the input shaft (WAn), the second element (E12) of the first planetary gear set (P1) is rotationally fixed to the second coupling shaft (W2), and the third element (E13) of the first planetary gear set (P1) is rotationally fixed to the first coupling shaft (W1);

wherein the first element (E21) of the second planetary gear set (P2) is rotationally fixed to the first coupling shaft (W1), the second element (E22) of the second planetary gear set (P2) is rotationally fixed to the second output shaft (WAb2), and the third element (E23) of the second planetary gear set (P2) is rotationally fixed to a stationary component; and wherein the first element (E31) of the third planetary gear set (P3) is rotationally fixed to the second coupling shaft (W2), the second element (E32) of the third planetary gear set (P3) is rotationally fixed to the second output shaft (WAb2), and the third element (E33) of the third planetary gear set (P3) is rotationally fixed to the first output shaft (WAb1).

27. The transmission (1) of claim 26, wherein two of the first, second, and third planetary gear sets (P1, P2, P3) are radially nested.

28. The transmission (1) of claim 26, further comprising a constant gear stage arranged in a power flow upstream from the input shaft (WAn).

29. The transmission (1) of claim 26, further comprising a first shift element (A) for shifting a first gear and a second shift element (B) for shifting a second gear are arranged in a power flow downstream from the input shaft (WAn).

30. The transmission (1) of claim 26, further comprising a shift element (S) for generating an interlock arranged between the first and second output shafts (WAb1, WAb2).

* * * * *